Figure 1:
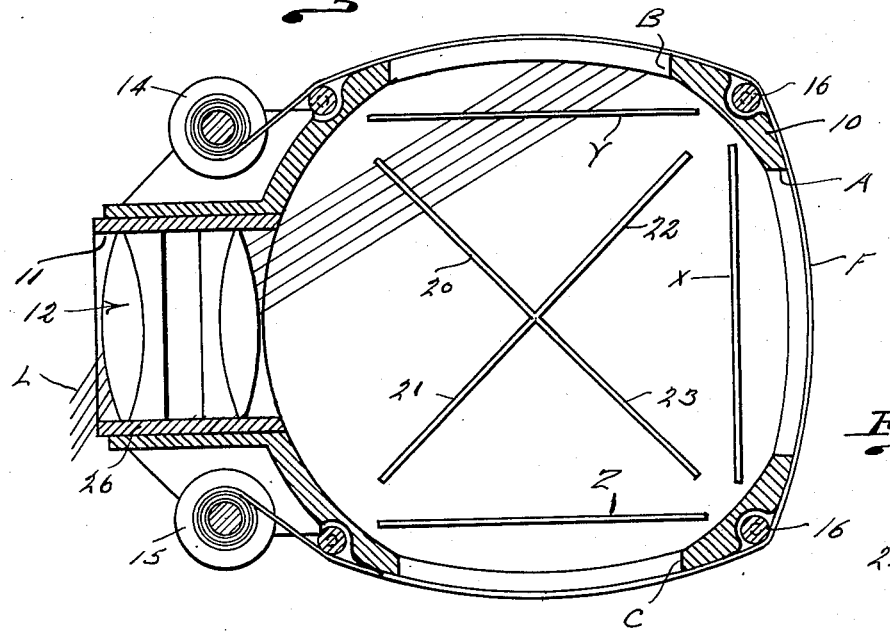

April 17, 1945. W. L. WRIGHT 2,373,936

LIGHT SHIELD FOR CAMERAS

Filed May 1, 1942

Inventor
WALTER L. WRIGHT
By
His Attorney

Patented Apr. 17, 1945

2,373,936

UNITED STATES PATENT OFFICE 2,373,936

LIGHT SHIELD FOR CAMERAS

Walter L. Wright, Santa Monica, Calif., assignor to Synchrome Corporation, Santa Monica, Calif., a corporation of California Application May 1, 1942, Serial No. 441,277

7 Claims. (Cl. 95—2)

This invention has to do with photography and has particular reference to reflecting cameras in which a plurality of exposures of different chromatic values are made simultaneously. A general object of this invention is to provide a simple, practical and effective means for preventing all but the rays actually forming the image from striking the lateral apertures of a camera of the character mentioned.

The lenses of cameras project a much larger circle of illumination than is required to cover the film aperture and the large circle of illumination illuminates the interior of the camera and in certain cases may produce a veiling or fogging of the image. This is especially true if the interior of the camera is small and is not constructed to guard against internal reflections striking the film.

When the camera embodies reflecting means arranged in the path of the light projected from the lens to simultaneously produce a plurality of color separation negatives fogging may occur in the lateral apertures as a result of the internal reflections and more particularly from the light travelling directly from the lens if the apertures are positioned so that the oblique light from the circle of illumination can strike them directly. In most cases the light that causes fogging in the lateral images is not reflected from the internal parts of the camera or from the reflecting means but travels directly from the lens to the lateral apertures. It is well known that the marginal portions of the circle of light projected from the lens are colored. The color adjacent the outer edge of the circle of light has little or no yellow in the outer bands. Accordingly, where color filters are used in the lateral aperture oblique rays produce a larger arc where a blue to red-violet filter is used in making the exposure because such a filter freely transmits the quality of color in the margin of the light circle while the filters containing yellow (minus blue) absorb this light to reduce the size of the arc.

Another object of this invention is to provide a grating or shield for use on a camera which effectively obstructs light which would otherwise illuminate the interior of the camera to produce a fogging effect.

Another object of this invention is to provide a grating or shield for use on a reflecting multi-exposure camera which operates to prevent the oblique rays from reaching the lateral apertures of the camera.

Another object of this invention is to provide a grating or shield of the character referred to that may be readily incorporated in the camera without necessitating alteration or rearrangement of any of the camera elements.

Another object of this invention is to provide a grating or shield of the character referred to that results in a minimum light loss at the negative apertures.

Another object of this invention is to provide a single grating or shield that may protect both lateral apertures against the fogging effects produced by the unwanted oblique light.

Another object of this invention is to provide a grating or shield of the character referred to that may be mounted to travel with the lens when the latter is focused to remain effective at all focused positions of the lens, or in other installations may remain fixed in the camera in a position to be effective throughout the focus range of the lens.

A further object of this invention is to provide a grating or shield of the character mentioned that is simple and inexpensive to manufacture.

Figure 4:
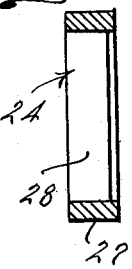
Figure 2:
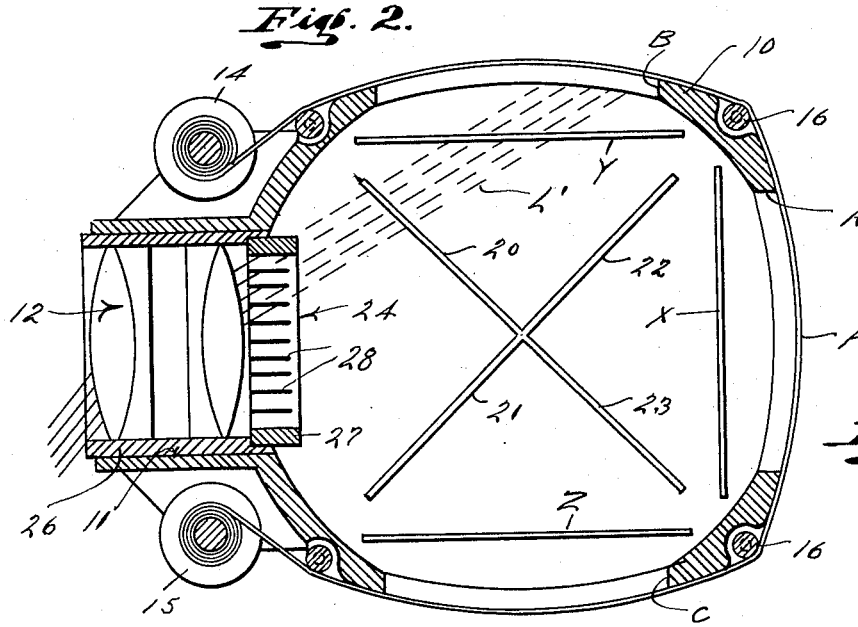
Figure 5:
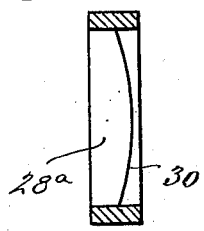
Figure 3:
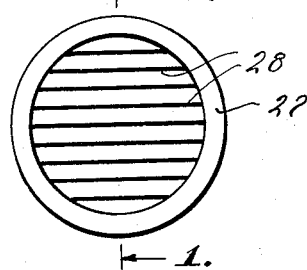

The various objects and features of my invention will be fully understood from the following detailed description of a typical preferred form and application of my invention, throughout which description reference is made to the accompanying drawing, in which:

Fig. 1 is a central longitudinal sectional view of a still picture camera with certain of the optical elements in elevation, diagrammatically illustrating the manner in which the oblique light rays pass directly from the lens to the lateral apertures to produce the halation. Fig. 2 is a view similar to Fig. 1 with a grating or shield of the invention positioned adjacent the lens and illustrating the manner in which the grating prevents the passage of the oblique light to the lateral apertures. Fig. 3 is a front or face elevation of the grating or shield removed from the camera. Fig. 4 is a vertical detailed sectional view of the shield, taken as indicated by line 1—1 on Fig. 3 and Fig. 5 is a view similar to Fig. 4 illustrating a modified form of the invention.

The present invention may be embodied in forms for use with still picture cameras, motion picture cameras and other light handling apparatus having two or more apertures and where the light is divided by reflector means and where illumination from oblique rays produces an undesirable "fogging" of the negatives. In the drawing I have shown the invention embodied in a still picture camera operative to simultaneously produce three negatives of different color values of the subject taken simultaneously from a single point of vision. It is to be understood that the invention is not to be construed as limited or restricted to the specific illustrative forms and applications of the invention herein disclosed but is to be taken as including any features and modifications that may fall within the scope of the claims.

The present invention is not primarily concerned with the structural details of the camera or with the details of the optical elements or the film handling means. In the drawing these elements are illustrated in a more or less schematic manner. The camera illustrated in the drawing includes a body 10 which is a hollow frame-like member whose wall is generally rectangular but made up of slightly curved sectors. The light admitting opening 11 is formed in the front wall of the camera body and is equipped with a suitable lens combination 12. The wall portion of the body 10 that directly opposes the light admitting opening 11 is provided with a film aperture A, while similar apertures B and C are provided in the two lateral side walls of the body. In the typical case illustrated the exposure apertures A, B and C are spaced substantially 90° apart. The negative film F is trained around the exterior of the body wall, extending from a supply roll 14 to a take-up roll 15. The rolls 14 and 15 are rotatably supported on the front portion of the body 10 at opposite sides of the light admitting opening 11. The film F is guided by guide rolls 16 recessed in the corner portions of the body 10 and the film is trained or directed to extend across the three apertures A, B and C.

The camera includes a light dividing means for dividing the light which is passed by the opening 11 and lens 12 into three separate or distinct light beams which are directed to the apertures A, B and C. The light dividing means is a reflecting means and comprises angularly related or crossed reflectors 20, 21, 22 and 23 mounted in the camera body 10 in the path of the incoming light. The reflectors 20, 21, 22 and 23 join or cross at a point in the central longitudinal axis of the incoming light beam and the reflectors are disposed at substantially 45° to said axis. The light dividing reflectors are formed of light transmitting and reflecting material and are preferably very thin. A light shaft upon striking one of the front reflectors, say the reflector 20, is divided thereby to have a portion which is transmitted straight back through the reflector 20 toward the aperture A and to have a portion which is reflected laterally by the reflector 20 toward the aperture C. The light that is transmitted through the front reflector 20 strikes the mating rear reflector 22 and is again divided having a portion which is transmitted straight back to the aperture A and a portion which is reflected by the reflector 22 laterally to the aperture B. The light which is reflected laterally by the front reflector 20 is transmitted through the front reflector 21 to reach the aperture C. This crossed-reflector light dividing means is well known in the art and is believed to require no further description.

Cameras of the type illustrated usually include filters at the film apertures for chromatically influencing the light before it reaches the negatives or films. The color values of the filters employed may be selected to provide for the production of natural color pictures. For the purpose of example it may be considered that the filter X at the aperture A has an orange value, that the filter Y at the aperture B has a violet value and the filter Z at the aperture C has a green value. It is to be understood that other combinations and arrangements of filters may be employed.

Reference is now made to Fig. 1 of the drawing which diagrammatically illustrates the manner in which the oblique light projected by the lens combination 12 is transmitted directly to the lateral apertures B and C to produce the undesirable fogging or veiling of the negatives. The lines L in this figure represent light from the subject which is passing through the marginal portions of the lens 12. This light is refracted by the lens combination and emerges from the lens near its periphery at such an angle that it passes directly to the rear portion of the lateral apertures B and C. This marginal light L, which I will term "oblique light," is handled or transmitted by the side portions of the lens combination 12 and forms the outer portion of the circle of light projected by the lens, which outer portion is colored or banded as above described. The oblique light L directly transmitted to the lateral apertures B and C produces the highly undesirable double exposures or fogging in the negatives at the apertures B and C and where the color filters are employed the fogging or double exposures are amplified or occur in larger arcs on the negatives due to the fact that the outer bands of the marginal lens-projected light has little or no yellow and is not filtered out by the blue to red-violet filters.

The present invention provides a grating or shield 24 which effectively eliminates the fogging produced as described in the preceding paragraph. The shield 24 is preferably, though not necessarily, arranged behind the lens 12. The mode of mounting or positioning the shield 24 may be different in different forms and classes of cameras. In a still picture camera employing a short focal length lens the shields 24 may be fixedly mounted, for example, it may be mounted on the support 25 of the reflectors 20 to 23 or may be mounted at the inner end of the opening 11. In such a case the shield 24 is positioned so that it clears the lens 12 when the lens is focused at infinity and the lens movement for complete focus adjustment is very slight so that the relationship between the shield and the lens is not varied to any appreciable extent during active use of the camera. Where a long focal length lens 12 is employed it is preferred to associate the shield 24 with the lens to be adjusted therewith during focusing so that it remains in the most effective relationship to the lens throughout the entire range of adjustment or focusing of the lens. Thus, in the case illustrated it may be assumed that the lens 12 has a long focal length and that the shield 24 is mounted in the carrier tube 26 of the lens. The lens carrying tube 26 is shiftable or adjustable in the opening 11 to effect focusing of the lens 12. The invention is not primarily concerned with the details of the lens adjusting means and such details are omitted from the present disclosure.

The shield 24 comprises a suitable body or frame 27 and a multiplicity of vanes or plates 28 in the frame. The shape and character of the frame 27 depend upon the position and mode of mounting of the shield 24. In the case illustrated the frame 27 is a cylindrical tube fitted or secured within the correspondingly shaped carrier 26.

The light shielding vanes or plates 28 of the shield 24 are thin sheets or strips extending across the interior of the frame 27 in spaced parallel relation. It is preferred to construct the members or plates 28 of very thin brass or other suitable opaque material to reduce the effective-light loss to a minimum. The width of the plates 28 and the spacing of the plates may be such that the oblique light L is fully and effectively cut out or obstructed so that it cannot reach the apertures B and C. This is diagrammatically illustrated in Fig. 2 where the broken lines L' represent the oblique light that has been obstructed by the shield plates 28. It will be apparent how the plates also greatly reduce internal light in the camera adjacent the apertures. The plates 28 are suitably fixed in the frame 27 and the series of spaced plates extends completely across the interior of the frame. The spacing of the plates 28 may be uniform throughout the shield and in the form of the invention illustrated in Figs. 2, 3 and 4 the plates are of equal width and have straight parallel edges. In Fig. 5 of the drawing I have illustrated a form of the invention in which the rear edges 30 of the shield plates 28a are curved or convex to allow the light to pass more evenly to the diagonals of the apertures B and C. With the exception of this difference in the shape of the shield plates 28a the shield of Fig. 5 may be the same as in Figs. 2, 3 and 4. This curving of the edges 30 allows more of the marginal rays from the lens to pass to the diagonals of the field. The curvature of the edges more or less follows the curvature of the back of the lens 12 and follows more specifically an arc of the circle of illumination projected from the lens to the apertures. This formation of the plates 28a allows for a more even distribution of light in the diagonals of the three apertures A, B and C, while effectively blocking the unwanted oblique light.

From the above detailed description it will be apparent that the present invention provides a very simple inexpensive means for obviating the oblique light in the lateral apertures of a reflector type multi-exposure camera. The plates 28 or 28a, as the case may be, effectively obstruct the highly undesirable light L without materially reducing the value of the light transmitted to the apertures A, B and C. Where the oblique rays are eliminated negatives of uniform light value are assured. The shields of the invention are readily adapted for use in different forms of the reflector type multi-exposure cameras and may be used without altering the general camera structure or disturbing the other camera elements.

Having described only a typical preferred form and application of my invention, I do not wish to be limited or restricted to the specific details herein set forth, but wish to reserve to myself any variations or modifications that may appear to those skilled in the art or fall within the scope of the following claims:

Having described my invention, I claim:

1. In a camera, a body having a light admitting opening, a negative exposing aperture aligned with the light admitting opening, and a lateral negative exposing aperture, lens means at the light admitting opening, light dividing means in the path of the light projected by the lens means dividing the light into separate shafts which travel to said apertures, and a grating adjacent the inner end of the lens means in the path of the light transmitted by the lens means including spaced thin plates disposed parallel with the axis of the lens and of substantial width in the direction of the axis of the lens to prevent light from passing directly from the lens means to said lateral aperture the plates being in planes parallel to the plane of the lateral aperture.

2. In a camera, a body having a light admitting opening, a negative exposing aperture aligned with the light admitting opening, and a lateral negative exposing aperture, lens means at the light admitting opening, light dividing means in the path of the light projected by the lens means dividing the light into separate shafts which travel to said apertures, and means for preventing the light which passes obliquely through the lens means from travelling directly to said lateral aperture including spaced shield plates in the path of the oblique light lying in planes which are substantially parallel with the plane occupied by said lateral aperture.

3. In a camera, a body having a light admitting opening, a negative exposing aperture aligned with the light admitting opening, and a lateral negative exposing aperture, lens means at the light admitting opening, light dividing means in the path of the light projected by the lens means dividing the light into separate shafts which travel to said apertures, and a grating in the path of the light transmitted by the lens means for preventing light from passing directly from the lens means to said lateral aperture, the grating including a plurality of spaced shield plates behind the lens means and lying in planes which are substantially parallel with the plane occupied by said lateral aperture.

4. In a camera, a body having a light admitting opening, a negative exposing aperture aligned with the light admitting opening, and a lateral negative exposing aperture, lens means at the light admitting opening, light dividing means in the path of the light projected by the lens means dividing the light into separate shafts which travel to said apertures, and a grating in the path of the light transmitted by the lens means for preventing light from passing directly from the lens means to said lateral aperture, the grating including a tubular frame, and spaced thin plates in the frame lying in planes which are substantially parallel with the plane occupied by the mouth of said lateral aperture.

5. In a camera, a body having a light admitting opening, a negative exposing aperture aligned with the light admitting opening, and a lateral negative exposing aperture, a shiftable carrier in said opening, lens means in the carrier, light dividing means in the path of the light travelling from the lens means for dividing the light into separate shafts which pass to the individual apertures, and means for preventing the oblique light which passes through the marginal portions of the lens means from travelling directly to the lateral aperture to cause fogging effects, the last named means including a plurality of spaced light shields in said carrier behind the lens means disposed in planes substantially parallel with the plane occupied by the mouth of said lateral aperture.

6. In a camera, a body having a light admitting opening, a negative exposing aperture aligned with the light admitting opening, and a lateral negative exposing aperture, a shiftable carrier in said opening, lens means in the carrier, light dividing means in the path of the light travelling from the lens means for dividing the light into separate shafts which pass to the individual apertures, and means for preventing the oblique light which passes through the marginal portions of the lens means from travelling directly to the lateral aperture to cause fogging effects, the last named means including a tubular frame in the carrier immediately behind the lens means, and a plurality of spaced thin plates in the carrier located in planes parallel with the axis of the lens and of substantial extent in the direction of said axis for obstructing said oblique light the plates being parallel to each other and in planes parallel to that of the lateral aperture.

7. In a camera, a body having a light admitting opening, a negative exposing aperture aligned with the light admitting opening, and a lateral negative exposing aperture, lens means at the light admitting opening, light dividing means in the path of the light projected by the lens means dividing the light into separate shafts which travel to said apertures, and a grating in the path of the light transmitted by the lens means for preventing light from passing directly from the lens means to said lateral aperture, the grating including a plurality of spaced shield plates behind the lens means and lying in planes which are substantially parallel with the plane occupied by said lateral aperture, the rear edges of the plates being convexly curved.

WALTER L. WRIGHT.